BAKORE MEMORY SIMULTANEOUSLY STORING IN DRO AND NDRO MODES

Filed Oct. 2, 1967 4 Sheets-Sheet 1

INVENTOR
ROBERT J. BERGMAN
BY Thomas J. Nikolai
ATTORNEY

STORED NDRO "1"

STORED NDRO "0"

BAKORE MEMORY SIMULTANEOUSLY STORING IN DRO AND NDRO MODES

Filed Oct. 2, 1967

3,508,223

BAKORE MEMORY SIMULTANEOUSLY STORING IN DRO AND NDRO MODES

Robert J. Bergman, St. Paul, Minn., assignor to Sperry Rand Corporation, New York, N.Y., a corporation of Delaware Filed Oct. 2, 1967, Ser. No. 672,686
Int. Cl. G11c *11/08, 11/14*
U.S. Cl. 340—174 3 Claims

ABSTRACT OF THE DISCLOSURE

A single magnetizable memory element that permits the simultaneous storage of logically different bits of digital information in the destructive readout (DRO) mode and in the nondestructive readout (NDRO) mode. The NDRO storage mode involves the relative angle of skew of the element's magnetic easy axis from a line parallel to the applied longitudinal field $H_l$ while the DRO storage mode involves the relative polarity of the element's magnetization along the element's easy axis.

BACKGROUND OF THE INVENTION

The present invention is an improvement invention in the Mated-Film memory element disclosed in my copending patent application, Ser. No. 504,008, now, Patent No. 3,382,491. My copending patent application discloses a Mated-Film element that includes two thin-ferromagnetic-film layers that are formed in a stacked, superposed relationship about a suitable drive line and whose overlapping sides form closely coupled portions creating a substantially-closed flux path about the enveloped drive line. The enveloped drive line is typically a common bit-sense line used to sense the element's output during a readout operation and to carry bit current during the write operation. The axis of anisotropy, or easy axis, is in the circumferential direction about the enveloped bit line, i.e., orthogonal to the longitudinal axis of the enveloped drive line, whereby the energized enveloped drive line provides a longitudinal drive field $H_l$ in a circumferential direction about the enveloped drive line in the area of the Mated-Film element causing the flux in the two superposed layers in the Mated-Film element to become aligned to an anti-parallel relationship. A second drive line, termed the enveloping word line, consists of two intercoupled conductors whose longitudinal axes are perpendicular to the plane of the magnetizable layers and which pass through apertures in the magnetizable layers and in the substrate upon which the Mated-Film element is deposited. The enveloping drive line, when energized by an appropriate current signal, produces a transverse drive field $H_t$ in the area of the Mated-Film element. Further, the magnetizable layers envelop the vertically oriented word lines providing substantially-closed flux paths for the transverse drive field $H_t$ thus permitting the use of substantially low level operating current signals.

In the copending patent application of R. J. Bergman, et al. Ser. No. 504,543, now Patent No. 3,435,435, there is disclosed a novel Solid Stack memory packaging scheme utilizing the Mated-Film element. This novel packaging scheme permits an extremely compact memory system utilizing word organized selection whereby the selection of any one vertically running word line pair reads out the information stored in the associated Mated-Film elements. This Solid Stack memory system incorporates no semiconductor devices other than the selection diodes utilizing externally packaged electronics for the control thereof.

The Solid Stack memory is comprised of a plurality of stacked, similar memory planes wherein each memory plane includes a plurality of pairs of apertures with a like plurality of similar memory elements therebetween. Each of the word lines is passed on through matching apertures, through the plurality of stacked memory planes, and returns up through matching apertures of matching pairs of apertures that envelop the associated memory elements. First ends of all word lines along the first Y direction are coupled in common to a first Y selection bus bar while a second end of each word line along a second, orthogonal X direction are separately coupled by separate diodes to a common second X selection bus bar. Thus, by selecting one of the X selection bus bars and one of the Y selection bus bars the word line that is common to the two selected bus bars is caused to couple a word drive field $H_t$ to the coupled memory elements inducing in the enveloped common bit-sense line a signal that is indicative of the informational content of the particular associated Mated-Film element.

SUMMARY OF THE INVENTION

The present invention is an improvement invention of such above discussed copending applications in that there is provided herein a Mated-Film memory element that may be incorporated in the Solid Stack memory system while permitting the storage of digital data therein by well known thermal, or annealing, techniques. The Bakore memory element of the present invention, so named because the digital information is stored by thermal means, or baked therein. The Bakore element of the present invention relates, in its preferred embodiment, to a Mated-Film element that includes two thin-ferromagnetic-film layers that are formed in a stacked, superposed relationship about a suitable drive line having parallel easy axes aligned with the magnetic axis of the enveloped drive line. It is a single, magnetizable memory element that permits the simultaneous storage of two logically different bits of information in the DRO mode and in the NDRO mode. The NDRO storage mode involves the relative angle of skew of the element's magnetic easy axis from a line parallel to the applied longitudinal field $H_l$ provided by the energized enveloped common bit-sense line.

The magnetization of the element is first set into a first, or a second and opposite, circumferential direction about the enveloped drive line as in the above discussed Mated-Film elements. This comprises the NDRO preconditioning or magnetic write-in operation. Next, with a relatively low intensity transverse drive field $H_t$ applied to the element by any suitable means, the element is subject to an elevated temperature, or "baked," for a sufficient period of time to cause the magnetizable layer's easy axes to be rotated a predetermined skew angle away from the priorly established circumferential direction. This bake-in causes the element's layers' easy axes to be rotated out of alignment with the longitudinal drive field $H_l$ axis, i.e., the magnetic axis of the enveloped drive line, an angle that is equal to or greater than the dispersion angle of the element's magnetizable layers. This comprises the thermal write-in operation. With the skew angle of the easy axes established by the thermal write-in operation the NDRO information is set into the memory element. By applying the proper drive fields to the element its magnetization may be set into a DRO informational state that is different than the NDRO informational state achieved by the bake-in process, i.e., the single Mated-Film element may store a NDRO "1" and a DRO "0" or vice versa. Further, the single memory element may store a NDRO "1" and a DRO "1" or, alternatively, a NDRO "0" and a DRO "0." Accordingly, it is a primary object of the present invention to provide a memory element that is capable of simultaneously storing two logically different bits of binary information. It is a further object of the present invention to provide an alterable NDRO memory state that cannot be destroyed by electrical transients. Thus, there is provided by the present invention a novel memory element, and the method of operation thereof.

DESCRIPTION OF THE PREFERRED EMBODIMENT

Figure 1:
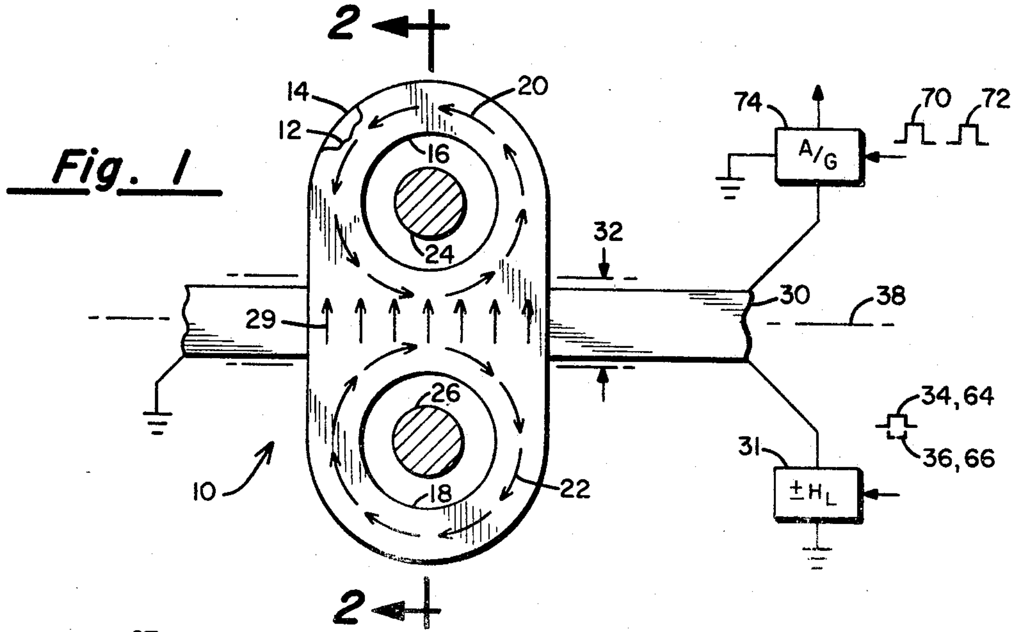
FIG. 1 is an illustration of a plan view of the preferred embodiment of the memory element of the present invention.

With particular reference to FIG. 1 there is presented an illustration of a plan view of the preferred embodiment of the present invention. As discussed hereinabove in more detail in the above discussed copending patent application of R. J. Bergman, Ser. No. 504,008, now Patent No. 3,435,435, the Mated-Film element achieves its unique output characteristic, as compared to coupled film elements, due to the sandwiched arrangement of the thin-ferromagnetic-film layers and the enveloped drive line. Memory element 10 is comprised of at least two thin-ferromagnetic-film layers 12 and 14 having two apertures 16 and 18 therethrough forming two closed flux paths for transverse word drive fields $H_t$ identified by arrows 20 and 22, respectively, generated by intercoupled word drive lines 24 and 26 when energized by a pulse source 27 (see FIG. 2). Thin-ferromagnetic-film layers 12 and 14 are of substantially the same planar form arranged in a stacked, superposed relationship enveloping a common bit-sense drive line 30. Layers 12 and 14 and drive line 30, through their superposed areas, define a memory area 32 in which those portions of thin-ferromagnetic-film layers 12 and 14 that overlap the enveloped drive line 30 and the immediate edge area thereof form a substantially closed flux path about common bit-sense line 30. Line 30 when energized by pulse source 27 generates a longitudinal bit or read drive field $H_l$ identified by arrows 29 in the memory area 32 defined by the superposed portions of elements 12, 14 and 30. It is to be appreciated upon inspection of FIG. 1, and FIG. 2 that the illustrated embodiment does not include those elements not necessary for an operative embodiment but does include only those elements that play an active part in the operation thereof. Accordingly, it is to be appreciated that any of many well known fabrication techniques may be utilized for the fabrication of the preferred embodiment; one example being that disclosed in the copending patent application of R. J. Bergman et al., Ser. No. 502,820, now Patent No. 3,375,004.

Figures 2, 3, 4:
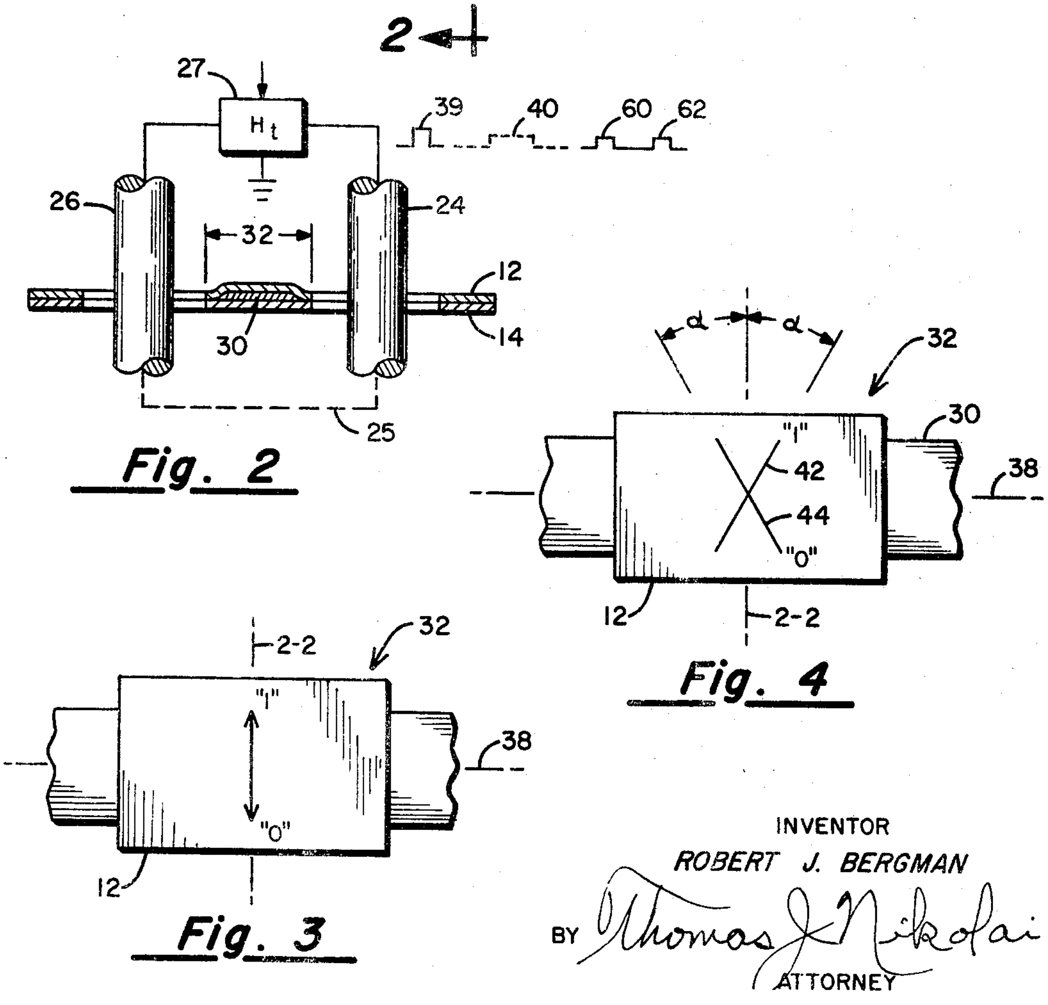
FIG. 2 is an illustration of a cross section of the memory element of FIG. 1 taken along the axis 2—2.
FIG. 3 is an illustration of the flux polarization in the memory area of the element of FIG. 1 after the magnetic preconditioning write-in operation.
FIG. 4 is an illustration of the easy axis orientation in the memory area of the element of FIG. 1 after the bake-in operation.

With particular reference to FIG. 2 there is presented an illustration of a cross section of memory element 10 of FIG. 1 taken along axis 2—2. FIG. 2 particularly illustrates the sandwiched arrangement of layers 12 and 14 and drive line 30 particularly in the memory area 32 defined by the overlapping portions of layers 12 and 14 about line 30. This view further particularly illustrates the closed flux path provided by layers 12, 14 to the transverse drive fields $H_t$ denoted by arrows 20, 22 when word drive lines 24 and 26, intercoupled by conductive element 25, are energized by pulse source 27.

Drive line 30 is, as stated above, symmetrically oriented along axis 38 and about axis 2—2 and sandwiched between or enveloped by, superposed portions of layers 12 and 14 in the area of memory area 32. The two superposed portions of layers 12 and 14 that overlap drive line 30 form at their overlapping sides closely coupled portions that create a substantially closed flux path about the enveloped drive line 30 for longitudinal drive fields $H_l$ of a first or a second and opposite polarity as developed by an energized drive line 30. Such longitudinal drive fields $H_l$ are identified by arrows 29 of a first or of a second and opposite polarity flowing in a circumferential direction orthogonal to axis 38 of drive line 30 which first or second and opposite circumferential directions are representative of a stored "1" or "0" in the memory area 32 of element 10. Additionally, layers 12 and 14 are formed in their final form in an annealing process to possess the characteristic of uniaxial anisotropy having a sufficiently high anisotropic constant $H_k$ with their anisotropic axes or easy axes, oriented skewed with respect to, or rotated slightly away from, axis 2—2. This annealing, or baking-in, process as discussed above, constitutes the NDRO write-in process. The DRO write-in process consists of orienting the polarization of the magnetization of the layers 12, 14 in the area of memory area 32 in a first or second and opposite direction along the particular skewed easy axis.

As stated hereinabove the present invention relates to a single, magnetizable memory element that permits the simultaneous storage of two logically different bits of digital information in the DRO mode and in the NDRO mode. The NDRO storage mode involves the relative angle of skew of the element's magnetic easy axis from a line parallel to the applied longitudinal field $H_l$ while the DRO storage mode involves the relative polarity of the element's magnetization along its easy axis. With particular reference to FIGS. 3 and 4 there are presented illustrations of the flux polarization in the memory area 32 as previously discused with particular reference to FIGS. 1 and 2. Although the illustrations of FIGS. 3 and 4 are limited to the memory area 32 it is to be appreciated that the memory element involved is that of memory element 10 of FIG. 1.

With memory element 10 having been formed in the preferred embodiment by any one of the above discussed methods the initial step in the preparation of memory area 32 for the storage of information therein comprises the following steps. Note, although the illustrations of FIGS. 3 and 4 and the discussion thereof is to be limited to the discussion of the effects of the applied drive fields to layer 12 it is to be recognized that layer 14 would be subjected to similar drive fields but of an opposite polarization with respect to the applied longitudinal drive fields $H_l$ whereby the effect upon such layer 14 would be similar to the effect upon the discussed layer 12 but of an opposite polarity. Further, the discussion of the applied current signals and the resulting drive fields relating to the bake-write operation of the following steps is particularly directed toward the current signal timing associated with FIG. 5.

(1) Pulse source 27 couples a current signal 39 to intercoupled word lines 24, 26 generating in the area of memory area 32 a transverse drive field $H_t$ of an intensity equal to or greater than $H_k$ of layer 12. This causes the magnetization M of layer 12 to become substantially aligned with axis 38.

(2) Pulse source 31 couples current signal 34 or 36 of equal but opposite polarities, respectively, to drive line 30. Drive field 34 representative of the writing-in of a "1" or drive field 36 representative of the writing-in of a "0" are of a sufficient intensity in the area of memory area 32 to steer the magnetization M of layer 12 into the proper polarization so that upon the subsequent removal of the concurrently applied transverse drive field 39 the magnetization M thereof shall assume the polarizations noted in FIG. 3.

(3) Pulse source 27 is de-energized removing transverse drive field 39 from the area of memory area 32 permitting the concurrently applied longitudinal drive field 34 or 36 to force the magnetization thereof to become aligned along axis 2—2 in the proper polarity as noted in FIG. 3.

(4) Pulse source 31 is de-energized terminating the so-applied drive fields 34 or 36 whereupon the magnetization M of layer 12 resides in the static, or remanent, conditions of polarization along axis 2—2 as noted in FIG. 3.

(5) Pulse source 27 is energized coupling a current signal 40 to the intercoupled word lines 24, 26 generating in the area of memory area 32 a transverse drive field 40 of an intensity less than $H_k/2$ of layer 12. Alternatively, the required transverse drive field could, as in a three-dimensional array of memory elements 10, be provided by an external Helmholtz coil or by the remanent magnetization about the closed flux path around apertures 16, 18. This transverse drive field 40 rotates the magnetization M of layer 12 out of alignment with its axis 2—2 causing it to be skewed therewith at an angle $\alpha$ that is at least as great as the dispersion angle of the layer 12. Accordingly, the magnetization M of layer 12 under the influence of the applied transverse drive field 40 is caused to become along the "1" skew axis 42 of the "0" skew axis 44 as determined by the previous application of longitudinal drive field 34 or 36 to achieve the associated polorization noted in FIG. 4.

(6) With transverse drive field 40 applied to memory area 32 element 10 is placed into an environment of an elevated temperature for a sufficient period to permit the predetermined skew axis 42 or 44 to be established in layer 12. This annealing of memory area 32 by the concurrently applied drive field 40 and elevated temperature is a well-known phenomenon and accordingly, no detailed discussion of the mechanism thereof is believed necessary. In a typical arrangement with layer 12 being a layer of approximately 81% Ni-19% Fe and of a thickness of 4,000 angstroms (A.) an ambient temperature of 150° centigrade (C.) for a duration of four hours has been determined to be sufficient to establish the desired skew axis while not inducing any deleterious effects upon memory element 10 or its associated packaging and electronics normally associated with a three-dimensional memory system including its selection electronics such as enclosed in the above referenced copending patent application of R. J. Bergman et al., Ser. No. 504,543, now Patent No. 3,435,435.

(7) The elevated temperature to which memory element 10 is subjected is terminated whereby memory element 10 is permited to return to ambient room temperature.

(8) Pulse source 27 is de-energized terminating drive field 40 permiting the remanent magnetization M of layer 12 to assume a remanent polarization along axis 42 or axis 44 of FIG. 4 denoting the storage of a NDRO "1" or of a NDRO "0," respectively.

With easy axes 42, 44 established in memory area 32 by the thermal write-in process described above, the NDRO information has been set into memory element 10, i.e., a memory area 32 having an easy axis 42 has a NDRO "1" stored therein while a memory area 32 having an easy axis 44 has an NDRO "0" written therein. With this NDRO informational state having been set into the particular memory area 32 it is now possible to write a DRO "1" or "0" in memory area 32 irrespective of whether it has a NDRO "1" or a NDRO "0" informational state stored therein. By applying the proper drive fields to memory area 32 its magnetization M may be aligned along its easy axis 42 or 44 in a first or a second and opposite direction representative of the writing of a DRO "1" or of a DRO "0" informational state. This DRO informational state may be different than or the same as the NDRO informational state achieved by the bake-in process described above. This operation of memory element 10 in its DRO and NDRO modes shall be discussed in more detail with particular reference to FIGS. 6 through 14 wherein FIG. 6 illustrates the timing relationship of the various signals associated with the operation of memory element 10 and FIGS. 7 through 14 illustrate the orientation of the applied drive fields and the resulting magnetization polarizations achieved thereby.

Figure 7:
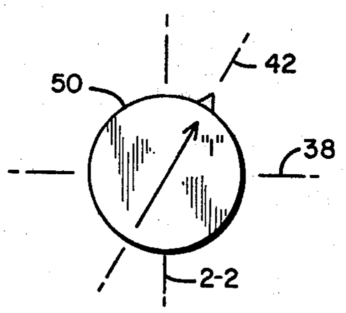
FIG. 7 is an illustration of the easy axis orientation and flux polarization after the thermal write-in of a "1."
Figure 8:
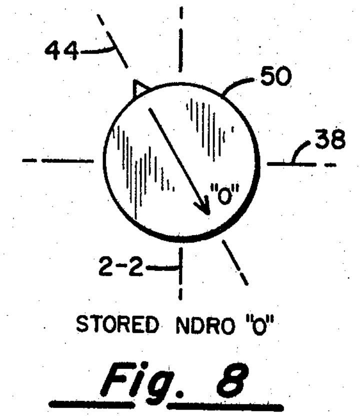
FIG. 8 is an illustration of the easy axis orientation and flux polarization after the thermal write-in of a "0."
Figures 9A, 9B, 10A, 10B:
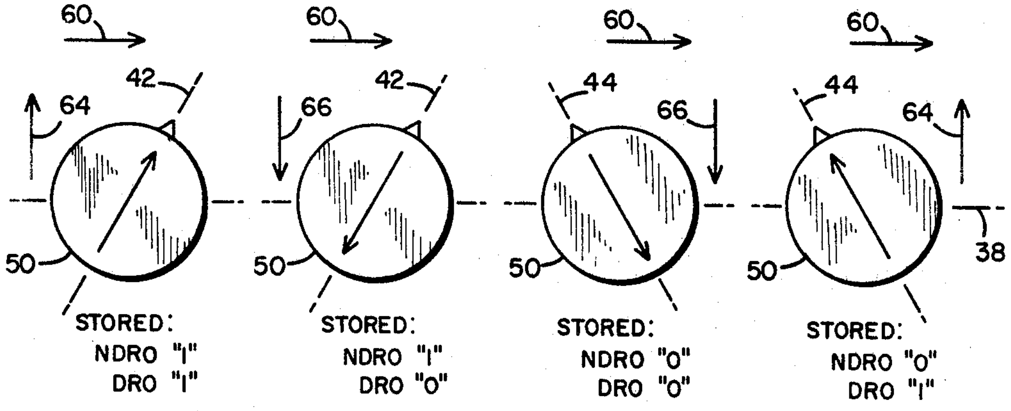
FIGS. 9*a* and 9*b* are illustrations of the easy axis orientation and flux polarizations after the DRO "1" and DRO "0" write-in operations on the NDRO "1" state of FIG. 7.
FIGS. 10*a* and 10*b* are illustrations of the easy axis orientation and flux polarizations after the DRO "0" and DRO "1" write-in operations on the NDRO "0" state of FIG. 8.

With particular reference to FIGS. 7 and 8 there are presented the flux polarization orientations along the easy axes 42 and 44, respectively, representative of the storing of an NDRO "1" and the storing of an NDRO "0," respectively, in an elemental area 50 of the layer 12 as illustrated and described with particular reference to FIG. 4. As discussed above with particular reference to FIG. 4 the informational states achieved by the thermal write-in operation are determined by the relative directional skew of the easy axis of the memory area 32. Thus, as described above FIG. 7 represents the storage of an NDRO "1" while FIG. 8 represents the storage of an NDRO "0"; it being remembered that NDRO storage is achieved by the thermal write-in operation determining the particular rotational relationship of the so-established skewed easy axis with the axis 2—2. Once the particular easy axis 42 or 44 has been established in the memory area 32 by the above described thermal write-in operation the relative polarization of the magnetization associated with memory area 32 along the easy axis 42 or 44 is immaterial as to the subsequent determination upon readout of whether or not the memory area 32 does in fact store an NDRO "1" or an NDRO "0." This relationship of the relative directional polarization of the magnetization of memory area 32 in a first or in a second and opposite direction substantially along the easy axis established by the thermal write-in operation is particularly illustrated in FIG. 9*a* and FIG. 9*b* wherein there is illustrated the storage of an NDRO "1" and in FIG. 10*a* and 10*b* wherein there is illustrated the storage of an NDRO "0"; both NDRO storage states capable of storing either a DRO "1" or a DRO "0."

Figure 6:
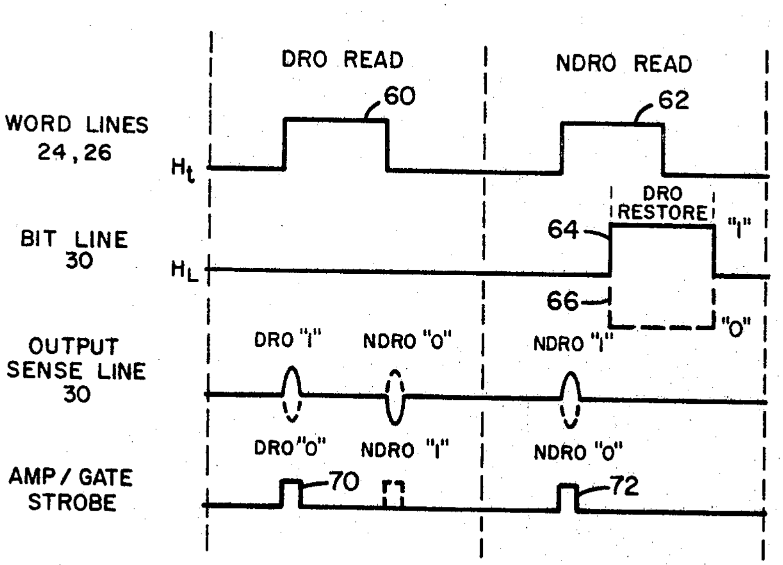
FIG. 6 is an illustration of the current signal timing associated with the operation of the element of FIGS. 1 and 2.

With particular reference to FIG. 6 there is presented an illustration of the current signal timing associated with the operation of memory element 10 of FIG. 1 with the various remanent flux states illustrated in FIGS. 9–14. It is apparent to anyone of ordinary skill in the art that once the skew, or easy, axes 42, 44 have been established in the elemental area 50, which for the present purpose may be considered to be a single-domain portion of layer 12 of memory area 32, the operationally applied drive fields are utilized to merely effect the particular directional polarization of elemental area 50 along the associated easy axis 42 or 44. A typical memory cycle performing DRO and NDRO read operations and a DRO wirte, or restore, operation will be discussed with particular reference to the timing of FIG. 6 and the informational states of FIGS. 9–14.

Initially, for the DRO read operation a transverse drive field 60 is inductively coupled to the elemental area 50 having the magnetic polarizations of FIGS. *9a, 9b,* 10*a* and 10*b,* which are the noted Stored states achieved by the prior application of the corresponding drive fields 62 and 64 or 66. Transverse drive field 60 is of an intensity in the area of area 50 that is equal to or greater than the $H_k$ of area 50 and may be coupled thereto by intercoupled word lines 24, 26 and by an energized pulse source 27 as in FIG. 2. Transverse drive field 60 while applied to the elemental area 50 would rotate the magnetization M of the polarities of FIGS. *9a, 9b,* 10*a* and 10*b* substantially into alignment with axis 38. Subsequently, the magnetic polarizations of area 50, when transverse drive field 60 is removed, would assume those corresopnding directions of FIGS. 11*a,* 11*b,* 12*a* and 12*b,* which directions would be the Readout states after the application and removal of the transverse drive field 60. This DRO read operation would induce in the inductively associated common bit-sense line 30 the corresponding signals noted in FIG. 6.

Figure 11A:
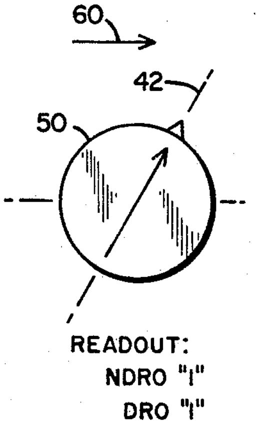
FIGS. 11*a* and 11*b* are illustrations of the flux polarizations after the DRO read operations on the DRO states of FIGS. 10*a* and 10*b*.
Figure 11B:
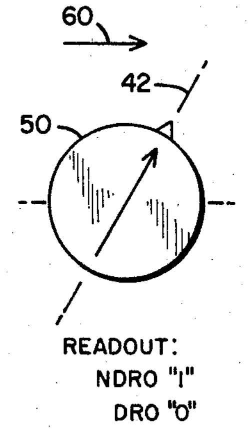
Figure 12A:
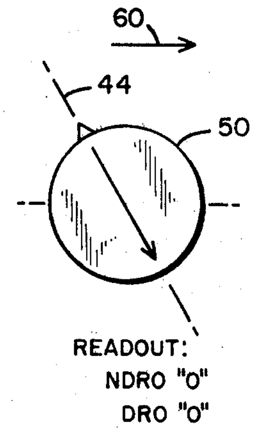
FIGS. 12*a* and 12*b* are illustrations of the flux polarizations after the DRO read operation on the DRO states of FIGS. 10*a* and 10*b*.
Figure 12B:
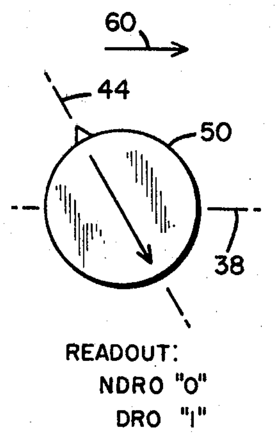
Figure 13A:
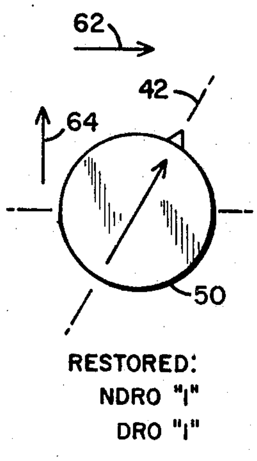
FIGS. 13*a* and 13*b* are illustrations on the flux polarizations after the DRO restore operation on the DRO states of FIGS. 11*a* and 11*b*.
Figure 13B:
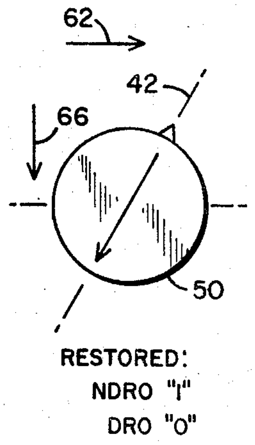
Figure 14A:
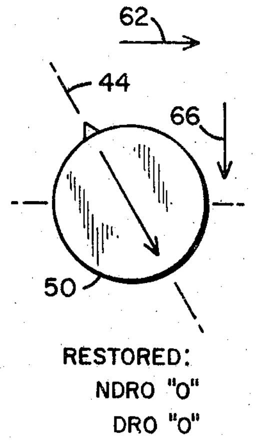
FIGS. 14*a* and 14*b* are illustrations of the flux polarizations after the DRO restore operation on the DRO states of FIGS. 13*a* and 13*b*.
Figure 14B:
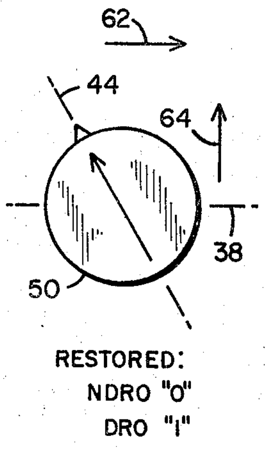

Next, for the NDRO read operation a transverse drive field 62 is inductively coupled to the elemental area 50 having the magnetic polarizations of FIGS. 11*a,* 11*b,* 12*a* and 12*b,* which are the noted Readout states achieved by the above described DRO read operation. Subsequently, and concurrently with the application of the transverse drive field 62, a DRO restore pulse 64 or 66 representative of the restoring, or write-in, of a "1" or of a "0," respectively, is inductively coupled to the elemental area 50. DRO restore pulses 64 and 66 are just of sufficient intensity in the area of area 50 to steer the magnetization M of area 50 into the proper "1" or "0" polarization only when concurrently effected by the transverse drive field 62. Subsequently, the magnetic polarizations of area 50, when transverse drive field 62 and longitudinal drive field 64 or 66 are removed, would assume those corresponding directions of FIGS. 13*a,* 13*b,* 14*a* and 14*b,* which directions would be the Restored, or write-in, states after the application and removal of the transverse drive field 60 and the longitudinal drive fields 64 or 66. This NDRO read operation would induce in the inductively associated common bit-sense line 30 the corresponding signals noted in FIG. 6. At this time the magnetic polarizations of area 50 are in the Restored states of FIGS. 13*a,* 13*b,* 14*a* and 14*b,* which states would be similar to the corresponding Stored states of FIGS. *9a, 9b,* 10*a* and 10*b,* ready for the next DRO read operation as described above.

As noted in FIG. 6 the output signals induced in the common bit-sense line 30 for the readout of the DRO and the NDRO information stored in area 50 may be detected at a plurality of different times during the memory cycle. However, it is preferred that the output signals on line 30 be gated on the application of the DRO read pulse 60 and the NDRO read pulse 62. Accordingly, at such times amplifier-gate strobe pulses 70 and 72 are coupled to amplifier-gate 74 (see FIG. 1) gating the associated output signal "1" or "0."

Figure 15:
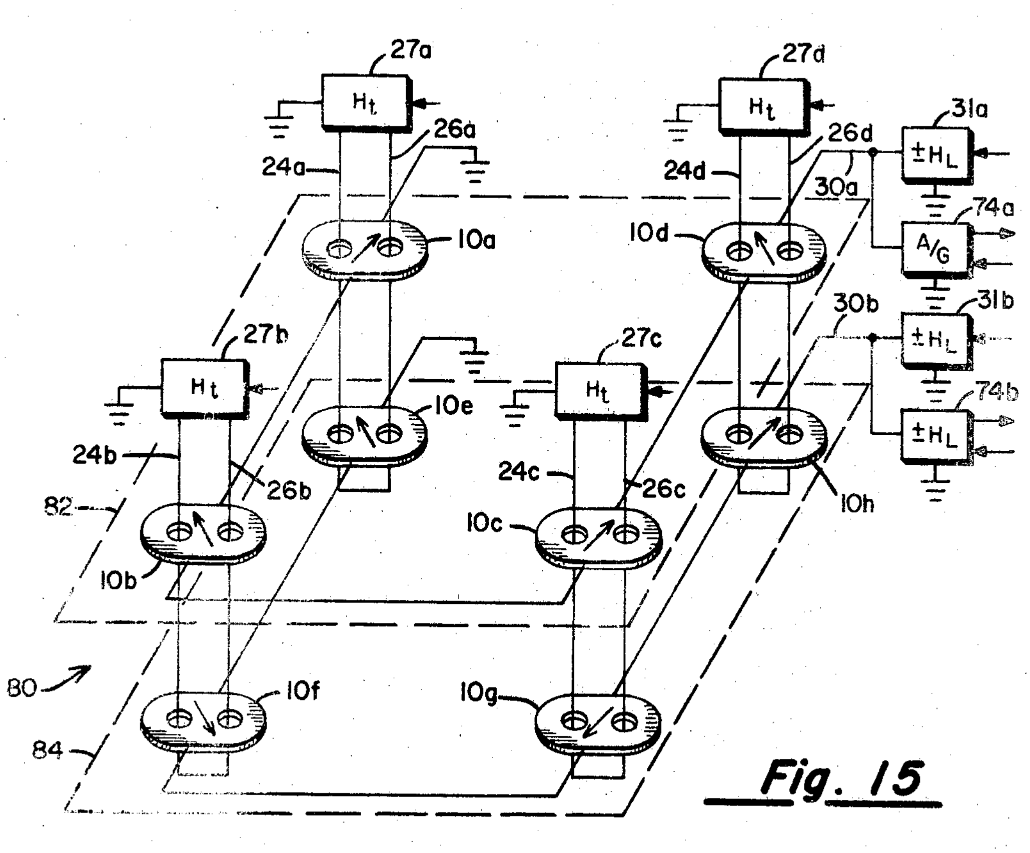
FIG. 15 is an isometric view of a plurality of the memory elements of FIG. 1 arranged in a three-dimensional array of two two-dimensional arrays forming four two-bit words.

With particular reference to FIG. 15 there is presented an isometric view of a plurality of memory elements 10 arranged in a three-dimensional array 80 that is comprised of two two-dimensional arrays 82, 84, each two-dimensional array being comprised of four elements 10. The first two-dimensional array 82 includes elements 10*a,* 10*b,* 10*c* and 10*d* serially coupled by common bit-sense line 30*a* grounded at one end and at the other end coupled by pulse source 31*a* and amplifier-gate 74*a*. Correspondingly, the second two-dimensional array 84 is comprised of elements 10· 10*f,* 10*g* and 10*h* serially coupled by common bit-sense line 30*b* which at one end is coupled to ground and at the other end is coupled to pulse source 31*b* and amplifier-gate 74*b*. The superposed, corresponding, or like-ordered, elements of the first and second two-dimensional arrays 82 and 84 that form the associated two-bit word, e.g., elements 10*a* and 10*e*, are coupled by intercoupled word lines 24, 26, e.g., word lines 24*a* and 26*a*, that are coupled to $H_t$ pulse source 27, e.g., pulse source 27*a*, in the same manner as previously described with particular reference to FIGS. 1 and 2. The packaging scheme for the illustrated three-dimensional array 80 may be similar to that of the above described R. J. Bergman et al. patent application, Ser. No. 504,543, now Patent No. 3,435,435. In this environment the present invention provides a compact memory system providing both DRO and NDRO storage with the DRO storage alterable electrically singly and the NDRO storage alterable electrically and thermally conjointly; both methods accomplished as previously discussed.

Figure 5:
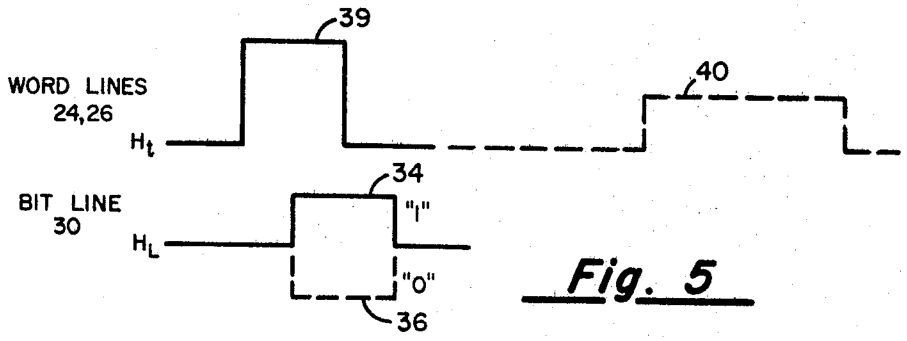
FIG. 5 is an illustration of the current signal timing associated with the operation of FIGS. 3 and 4.

With memory elements 10*a* through 10*h* storing the noted DRO and NDRO information, by the arrow representing the associated flux polarization in layer 12, a general discussion of the operation of array 80 shall proceed in accordance with the signal timing relationships of FIGS. 5 and 6. As the NDRO preconditioning or magnetic write-in of a "1" or of a "0" as illustrated in FIG. 3 requires the application of opposite polarity longitudinal drive fields $H_1$, it is apparent that the NDRO preconditioning operation of three-dimensional array 80 requires an NDRO preconditioning cycle for each word of the array. Further, it is equally apparent that the NDRO thermal, or bake-in, storage operation will require only one bake-in cycle for all words of the array.

For the NDRO bake-write operation of the first two-bit word formed by elements 10*a* and 10*e* of three-dimensional array 80, using the two-bit word associated with pulse source 27*a* as an example, pulse source 27*a* couples current signal 39 to its associated word line pair 24*a,* 26*a*. Next, pulse sources 31*a* and 31*b* couple current signals 36 and 34 to line 30*a* and 30*b*, respectively, the conjoint action thereof causing the magnetization M of memory elements 10*a* and 10*e* to assume the NDRO preconditioning "0" and "1" polarization, respectively of FIG. 3. Similarly, for the NDRO preconditioning operation in the associated two-bit words, pulse sources 27*b,* 27*c* and 27*d* would couple a current signal 39 to the associated word line pairs 24*b,* 26*b*; 24*c,* 26*c*; and 24*d,* 26*d*. As before, pulse sources 31*a* and 31*b* would couple current signal 36 to lines 30*a* and 30*b*, the conjoint action thereof causing the magnetization M of elements 10*b,* 10*f*; 10*c,* 10*g* and 10*d,* 10*h* to assume the associated "1" or "0" polarizations of FIG. 3. This operation comprises the NDRO preconditioning magnetic write-in of the NDRO bake-write operation.

After the above NDRO preconditioning magnetic write-in operation, the three-dimensional array 80 would be subjected to an elevated temperature of approximately 150° C. for approximately four hours. During this NDRO bake-write period pulse sources 27*a,* 27*b,* 27*c* and 27*d* would be coupling a current signal 40 to their associated word line pairs, and, accordingly, memory elements 10*a*–10*h*, causing the magnetization thereof to be rotated, or skewed, out of alignment with their axes 2—2 a rotational direction as determined by the NDRO preconditioning informational content of a stored NDRO "1" or of a stored NDRO "0." Alternatively, the required transverse drive field for the NDRO bake-write operation could be provided by an externally provided drive field as in the S. M. Rubens et al. Patent Nos. 2,900,282 and 3,155,561 or by the remanent magnetization about the closed flux paths around apertures 16, 18. After the bake-write operation, with both the elevated temperature and the transverse drive field 40 removed, the remanent magnetization M of memory elements 10*a*–10*h* would be polarized along their respective skewed easy axes in accordance with FIG. 4. With the NDRO information having been stored in array 80 it is now possible, through the signal timing relationships of FIG. 6, to achieve DRO read and NDRO read operation thereof while providing DRO store, or restore, in a manner previously described with particular respect to FIG. 6.

For the DRO read, NDRO read and DRO store, or restore, portions of the memory cycle of array 80, operation of array 80 shall proceed with the discussion of the signal timing relationships of FIG. 6; for ease of discussion it shall be assumed that a prior DRO write-restore operation has been performed setting the elements 10 of array 80 in the desired DRO (and NDRO) stored states. For the DRO read cycle of array 80 only one of pulse sources **27*a*, 27*b*, 27*c* or 27*d* couples a current signal 60 to its associated word line pairs 24, 26. This is so as all the bits of a multi-bit word stored in array 80 are associated with one word line pair; i.e., array 80 is word-organized along the word line pairs 24, 26. Thus, it is apparent that array 80 consists of four two-bit words each two-bit word associated with a unique word line pair 24, 26; i.e., the two-bit word of memory elements 10*a* and 10*e* are associated with word line pair 24*a*, 26*a*. Again using the two-bit word associated with pulse source 27*a* as the addressed word, the energization of pulse source 27*a* induces the noted DRO "1" and DRO "0" output signals in lines 30*a* and 30*b*, respectively, associated with elements 10*a* and 10*e*, respectively. The energized amplifier-gates 74*a* and 74*b* when strobed by pulse 70 would emit therefrom the corresponding signals indicative of the readout of the two-bit DRO word "10" from elements 10*a* and 10*e***.

Next, the NDRO read cycle is initiated by pulse source **27*a* coupling current signal 62 to its associated word line pair 24*a*, 26*a* inducing in memory elements 10*a* and 10*e* a transverse drive field 62. Field 62 effects the magnetization M of memory elements 10*a* and 10*e* inducing in the coupled common bit-sense lines 30*a* and 30*b*, respectively, output signals representative of an NDRO "0" and an NDRO "1," respectively. Energization of amplifier-gates 74*a* and 74*b* by strobe pulse 72 provides output signals therefrom representative of the readout of the two-bit NDRO word "01" from elements 10*a* and 10*e*. Concurrently with the application of field 62 to memory elements 10*a* and 10*e* pulse source 31*a* couples a current signal 64 to its associated common bit-sense line 30*a*. The conjoint action of fields 62 and 64 at memory element 10*a*** restores the magnetization polarization thereof back into its original DRO "1" state illustrated in FIG. 9*b*. Coincidentally therewith, pulse source **31*b* couples current signal 66 to its associated, common bit-sense line 30*b*. The conjoint action of fields 62 and 66 at memory element 10*e*** causes the magnetization polarization thereof to be restored into its original DRO "0" polarization illustrated in FIG. 9*b*. It is apparent to any one of ordinary skill in the art that the two-bit words associated with pulse sources **27*b*, 27*c* and 27*d* may be subjected to a like memory cycle of FIG. 6; the particular DRO restore pulse 64, 66** utilized determining the DRO stored state illustrated in FIGS. 9*a*, 9*b*, 10*a* and 10*b*. The energization of pulse source **27*a* induces the noted NDRO "0" and NDRO "1" output signals in lines 30*a* and 30*b***, respectively.

Thus, it is apparent that there has been described herein a preferred embodiment of the present invention that permits the simultaneous storage of logically different bits of digital information in the DRO mode and in the NDRO mode while permitting thermal write-in of the NDRO mode information and electrical write-in of the DRO mode information. Thus, it is apparent that there has been described and illustrated herein a preferred embodiment of the present invention that provides a novel memory system.

Having, now, fully illustrated and described my invention what I claim to be new and desire to protect by Letters Patent is:

1. The method of storing digital information in a magnetizable memory element, comprising:
   - inductively coupling to a magnetizable memory element having its magnetization aligned in a first or in a second and opposite direction along a given axis a first transverse drive field for rotating said magnetization from said given axis an angle at least as great as said memory element's dispersion angle for establishing a particular one of a first or of a second and oppositely rotated, from said given axis, skew axis in said memory element;
   - applying an elevated temperature to said memory element for annealing said particular one of said first or said second skew axis in said memory element as a corresponding easy axis;
   - removing said elevated temperature and said transverse drive field from said memory element;
   - said particular one of said first or said second easy axis representing the storage of an NDRO "1" or of an NDRO "0," respectively, in said memory element.
   - concurrently inductively coupling to said memory element a second transverse drive field and a longitudinal drive field of a first or of a second and opposite polarity for establishing the magnetization of said memory element in a particular first or second and opposite polarization along said particular first or second easy axis representing the storage of a DRO "1" or of a DRO "0" in said memory element;
   - said memory element concurrently storing NDRO and DRO information in a particular easy axis and in a particular magetization polarization along said particular easy axis, respectively.

2. The method of storing digital information in a magnetizable memory element, comprising:
   - inductively coupling a first transverse drive field to said memory element;
   - concurrently with said first transverse drive field and orthogonal thereto inductively coupling to said memory element a first longitudinal drive field of a first or of a second and opposite polarization;
   - removing said first transverse drive field from said memory element permitting said first longitudinal drive field to establish the magnetization of said memory element in said first or second polarization along a given axis;
   - removing said first longitudinal drive field from said memory element;
   - inductively coupling a second transverse drive field to said memory element for rotating the magnetization of said memory element away from said given axis an angle that is at least as great as the dispersion angle of said memory element for establishing a first or a second and oppositely rotated skew axis, each of which is associated with said first or second magnetization polarization, respectively;
   - applying an elevated temperature to said memory element for annealing said first or second skew axis in said memory element as a corresponding easy axis;
   - removing said elevated temperature from said memory element;
   - removing said second transverse drive field from said memory element;
   - said first or said second easy axis in said memory element comprising the storage of an NDRO "1" or of an NDRO "0," respectively, therein;
   - inductively coupling a third transverse drive field to said memory element;
   - concurrently with said third transverse drive field and orthogonal thereto inductively coupling to said memory element a second longitudinal drive field of a first or of a second and opposite polarization;
   - removing said third transverse drive field from said memory element permitting second longitudinal drive field to establish the magnetization of said memory element in a first or in a second and opposite polarization along said first or said second easy axis;

said first or said second polarization along said first or said second easy axis comprising the storage of a DRO "1" or of a DRO "0" therein.

3. The method of storing digital information in an array of a plurality of magnetizable memory elements, each having its magnetization aligned in a first or in a second and opposite polarization along a given axis, the method comprising:

inductively coupling to the memory elements of said array a transverse drive field for rotating the magnetization of said memory elements away from said given axis to an angle at least as great as said memory elements' dispersion angle for establishing a particular one of a first or of a second and oppositely rotated, from said given axis, skew axis in said memory elements, said first or second and oppositely rotated skew axis corresponding to the first or second and oppositely polarized magnetization of said memory elements along said given axis, respectively;

applying an elevated temperature to the memory elements of said array for annealing the particular one of said first or second skew axis in the memory elements as a corresponding easy axis;

removing said elevated temperature and said transverse drive field from the memory elements of said array;

said particular one of said first or second easy axis that has been established in each of said memory elements representing the storage of an NDRO "1" or of an NDRO "0," respectively, in said memory element;

concurrently inductively coupling to said memory elements a second transverse drive field and a longitudinal drive field of a first or of a second and opposite polarity for establishing the magnetization of said memory elements in a first or second and opposite polarization along said particular first or second easy axis representing the storage of a DRO "1" or of a DRO "0" in said element;

said memory elements concurrently storing NDRO and DRO information in a particular easy axis and in a particular magnetization polarization along said particular easy axis, respectively.

References Cited

UNITED STATES PATENTS

| | | | |
|---|---|---|---|
| 3,231,874 | 1/1966 | James | 340—174 |
| 3,293,620 | 12/1966 | Renard | 340—174 |
| 3,295,115 | 12/1966 | Snyder | 340—174 |
| 3,427,600 | 2/1969 | Middelhock | 340—174 |

OTHER REFERENCES

Journal of Applied Physics, "Magnetic Domain Patterns On Thin Films," by Williams et al., vol. 28, No. 5, May 1957, pp. 548–555.

STANLEY M. URYNOWICZ, Jr., Primary Examiner